Aug. 7, 1962  C. M. HARTER  3,048,432
FISHING ROD JOINT
Filed Sept. 29, 1958
FIG. 1
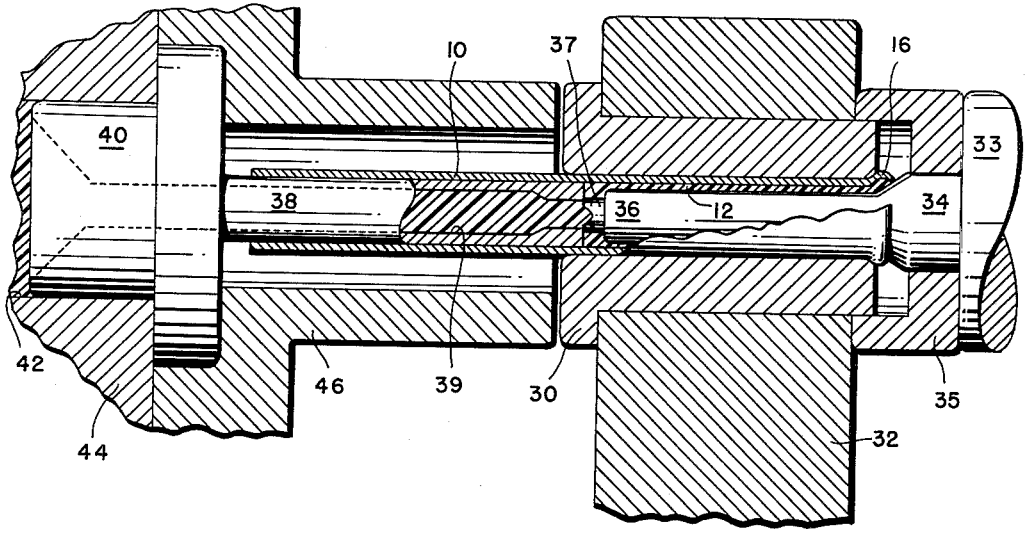
FIG. 2
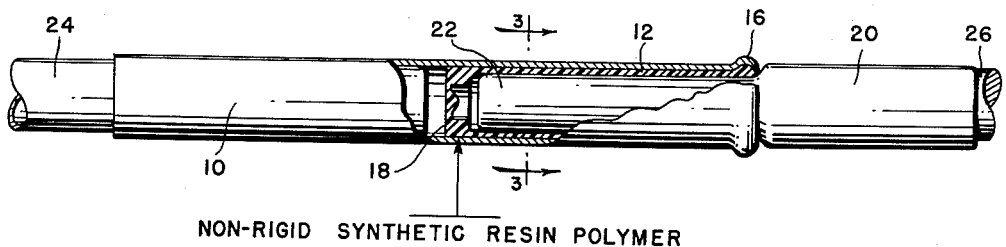
NON-RIGID SYNTHETIC RESIN POLYMER
FIG. 3
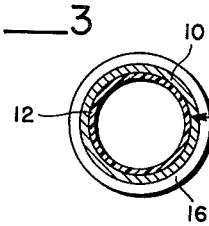
FIG. 4
FIG. 5
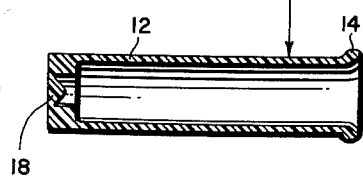
INVENTOR.
CLAIR M. HARTER
BY
Smith + Tuck
ATTORNEYS United States Patent Office
3,048,432
Patented Aug. 7, 1962

3,048,432
FISHING ROD JOINT
Clair M. Harter, 13505 Interurban Ave. S.,
Seattle, Wash.
Filed Sept. 29, 1958, Ser. No. 764,045
4 Claims. (Cl. 287—126)

This invention relates to improvements in a fishing rod joint and, more particularly, to a ferrule for fishing rods and the like.

Fishing rod joints are usually formed of interfitted male and female members which are assembled and disassembled by sliding engagement. It is imperative that these parts fit closely when assembled and it is equally imperative that they may be easily separated when a jointed rod is to be dismantled. Usually the telescoping cylindrical male and female members are formed of drawn metal tubes shaped and sized to close tolerances and of minimal thickness to reduce bulk, stiffness and weight. Particularly with respect to extremely thin-wall and close fitting members it is difficult to manufacture and to use such rod ferrules. Such difficulties involve problems of producing close interfitting in easily deformed thin-metal deep drawn tubes. And assembly and disassembly is often hindered by high friction developed between closely mated elements and also between less perfectly matched but misshapen ferrule parts, be they due to incidents of manufacture or accidents of use.

It is among the more important objects of this invention to provide joint means for a jointed fishing rod which are easy to assemble and disassemble manually; which during assembly provides an extremely tight joint but which may at all times be easily disassembled manually but not accidentally; which affords in effect a lubricated joint but actually involves no lubricant in the normal sense; which is simple and easy to produce yet will have a long and useful life; which provides between the basic male and female members a sleeve that affords a degree of resiliency and removes some of the inherent stiffness of normal rod ferrules; and which does not make more bulky and unattractive the normal sized ferrule joints even though apart is added.

These and other objects and advantages of the invention will be more apparent during the course of the following description in which is set forth a preferred embodiment of my invention.

In the drawings accompanying this specification, and in which like reference numerals refer to like parts throughout the same:

FIGURE 1 is a fragmentary sectional view of molding equipment used in the production of my ferrule, portions being omitted for convenience of illustration;

FIGURE 2 is a side view of my ferrule, with portions broken away and others shown in section to show internal arrangement of parts;

FIGURE 3 is a cross section on line 3—3 of FIGURE 1;

FIGURE 4 is an enlarged fragmentary section of the entrant end of the female ferrule part; and FIGURE 5 is a longitudinal sectional view of a molded liner used in my rod joint.

Referring to FIGURE 2, the rod joint comprises the tubular female sleeve 10 having a resilient liner cup or socket 12 mounted therein, inward from the entrant or adit end. The periphery or mouth of the entrant end of sleeve 10 is expanded slightly and rolled over to provide the concavo-convex collar 16 having an inner groove. Socket cup 12 has an outstanding bead edge 14 which is seated in the groove in collar 16 to secure the parts against undesired disassembly. Socket 12 closely fits the interior of sleeve 10 along its length.

Cup 12 is formed of a non-rigid synthetic resin polymer by an injection molding method in the apparatus schematically shown in FIGURE 1.

A travelling collar 30 receives a blank sleeve 10 so that the bead 16 is seated and supported against distortion. Collar 30 is mounted in a movable base fixture 32 suitably located in a molding machine (not shown). A male molding pin 34 has a reduced end 36 and is disposed in cantilever fashion on a carrier 33 mounted in conventional fashion to extend into and be withdrawn from sleeve 10. A centering and confining cup 35 on carrier 33 mates with collar 30 and surrounds the end of sleeve 10 during molding of the liner 12. Pin 36 has a reduced neck 37 on its inner end.

Injection nozzle 38 outstands from the front of die plug 40 and receives the tubular sleeve 10 when the same and its collar is moved, as from the right to left in FIGURE 1, over it. The free end of nozzle 38 during molding is in close proximity to neck 37 to form the bottom of liner 14.

Plug 40 is mounted at the front of chamber 42 of the machine head 44 and is surrounded by the hollow housing 46.

A supply of fluid resin is introduced to the passage 39 of nozzle 38 from chamber 42 within head 44. The plastic molding material under pressure, flows through the nozzle passage 39 and is discharged against the reduced end 37 of pin 36 whence it flows, during molding around the pin within the confines of sleeve 10 spaced therefrom. As the plastic material reaches the groove of bead 16 it may "flash" slightly around the pin in the foundation of the interfitting groove-and-flange coupling that assists in locking the parts together.

Following molding while sleeve 10 is gripped in holder 30, pin 36 is withdrawn. Practically simultaneously pin 30 is likewise withdrawn. The sleeve 10 is then removed from the holder 30 whereupon the operation may be repeated.

In use in a fishing rod, sleeve 10 is normally fitted to a larger rod section 24, and a smaller rod section has a male ferrule member 20 secured thereon. The reduced end 22 closely fits into socket cup 12 when the ferrule functions to join the rod sections.

It is preferable that the cup 12 be molded of resilient material having a smooth low frictional resistance on its inner surface. Additionally it is desirable that, being molded in situ so to speak, the cup 12 adheres to the inner wall of sleeve 10. An ideal material for molding cup 12 is one capable of use without lubricant.

A very useful and desirable material for molding socket cup 12 is a high molecular weight ethylene polymer solid obtained by polymerizing ethylene at high temperatures and pressures. Such polymers are inexpensive, easy to handle and capable of accurate dimensional molding. They need no lubricant for my purpose and because they do not corrode and are light in weight are generally very ideal liners for a ferrule. They are characterized by low shrinkage and by being soft enough to receive the soft brass or other metals from which ferrules are formed with searing or scratching.

Broadly the desirable molding compounds for forming cup 12 may be described as non-rigid synthetic resin polymers of which the tradenames are nylon, polyethylene, and the like. In its preferred form cup 12 has a bottom wall 18 spanning its inner end.

Socket 12 is preferably slightly smaller in internal diameter than the external diameter of male member 22 so that when the latter is inserted the resilient material from which the socket is formed is slightly compressed and secure seating of the joint is obtained. For example, assuming a diameter X for member 22 the internal diameter of socket 14 may be about X—.005″. The wall thickness of socket 14, since it is externally supported by sleeve 10, may be about .010" to .015" to avoid bulkiness in the joint and yet provide a long and useful life for the socket.

Sockets 12 formed of a non-rigid ethylene polymer are self lubricated. This aids in the insertion and removal of the male member 22 from the socket and overcomes a common difficulty encountered by fishermen when they attempt to disassemble their jointed rods.

Many variations of this invention will occur to those skilled in the pertinent art. Those made within the spirit and scope of this invention as defined by the claims are encompassed herein. I therefore do not limit myself to the specific embodiment of the invention set forth in this specification.

Having described my invention, I claim:

1. A rod joint for sectional fishing rods, comprising: a cylindriform metallic male ferrule adapted to receive and be attached to a first rod section; an elongated tubular ferrule sleeve to receive and be attached to a second rod section to be joined in extension of said first rod section and having a mouth to loosely receive said male ferrule in mating relation; and a resilient, low-friction, non-metallic socket sleeve securely disposed within said sleeve inward of its mouth, said socket sleeve having an internal diameter less than the external diameter of said male member.

2. The strucure according to claim 1 in which there is an interfitting groove-and-flange coupling between said resilient sleeve and said tubular sleeve adjacent the mouth of the latter.

3. The structure according to claim 1 in which the entrant end of the tubular sleeve has an inwardly open annular groove adjacent its mouth, and said resilient socket sleeve has an outstanding member around its mouth interfitting into said groove.

4. The structure according to claim 1 in which the resilient socket sleeve is provided with an integral bottom wall spanning said tubular member and dividing the same between its ends.

References Cited in the file of this patent

UNITED STATES PATENTS

| | | |
|---|---|---|
| 462,822 | Marsters | Nov. 10, 1891 |
| 467,979 | Latulip | Feb. 2, 1892 |
| 1,262,936 | Fowler | Apr. 16, 1918 |
| 1,747,942 | Lanninger | Feb. 18, 1930 |
| 1,786,719 | Dippman et al. | Dec. 30, 1930 |
| 1,871,229 | Welch | Aug. 9, 1932 |
| 2,057,009 | Chadwick | Apr. 16, 1936 |
| 2,106,667 | Thirly | Jan. 25, 1938 |
| 2,245,154 | McWane | June 10, 1941 |
| 2,546,312 | Larymore | Mar. 27, 1951 |
| 2,664,548 | Hall | Dec. 29, 1953 |
| 2,679,911 | Bhand | June 1, 1954 |
| 2,844,125 | Wehn | July 22, 1958 |

FOREIGN PATENTS

| | | |
|---|---|---|
| 1,084,948 | France | July 13, 1954 |